(12) United States Patent
Oster et al.

(10) Patent No.: US 12,710,094 B2
(45) Date of Patent: Aug. 18, 2026

(54) ACTUATING DEVICE

(71) Applicant: Stabilus GmbH, Koblenz (DE)

(72) Inventors: Peter Oster, Koblenz (DE); Andreas Ritter, Hilgert (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 18/502,490

(22) Filed: Nov. 6, 2023

(65) Prior Publication Data

US 2024/0167545 A1 May 23, 2024

(30) Foreign Application Priority Data

Nov. 15, 2022 (DE) ..................... 10 2022 130 161.3

(51) Int. Cl.
*F16H 25/20* (2006.01)
*E05F 15/603* (2015.01)

(52) U.S. Cl.
CPC ............ *F16H 25/20* (2013.01); *E05F 15/603* (2015.01); *E05Y 2201/604* (2013.01); *E05Y 2900/532* (2013.01); *F16H 2025/2084* (2013.01); *F16H 2025/209* (2013.01)

(58) Field of Classification Search
CPC ............. F16H 25/20; F16H 2025/2084; F16H 2025/209; E05F 15/603; E05Y 2201/604; E05Y 2900/532
See application file for complete search history.

(56) References Cited

U.S. PATENT DOCUMENTS 6,026,697 A 2/2000 Krbec et al.
2018/0155968 A1* 6/2018 Miu ........................ E05F 15/70
2019/0016364 A1 1/2019 Palmer et al.
2019/0316661 A1 10/2019 Simon
2022/0307314 A1* 9/2022 Schnapp ............... E05F 15/622

FOREIGN PATENT DOCUMENTS

DE 102018201840 A1 8/2018
DE 202018104555 U1 8/2018
DE 102019209173 A1 12/2020
DE 102019211932 A1 2/2021
EP 3548685 A1 10/2019

OTHER PUBLICATIONS

German Application No. 102022130161.3 , German Search Report, mailed Aug. 18, 2023, 7 pages.
German Application No. 10 2022 130 161.3, Third-Party Submission mailed Mar. 19, 2026, 5 pages.

* cited by examiner

*Primary Examiner* — Randell J Krug
(74) *Attorney, Agent, or Firm* — Kilpatrick Townsend & Stockton LLP

(57) ABSTRACT

Actuating device for a vehicle part movable relative to a body of a vehicle, and in particular a vehicle door or a vehicle hatch, including a drive assembly having a drive unit and a drive element driven by the drive unit, and an actuating element which can be displaced relative to the drive assembly along a displacement axis by means of the drive unit, where the actuating element is connected to a carriage assembly which is in threaded engagement with a spindle, where the spindle can be driven rotationally about an axis of rotation by the drive unit, and where in that a central axis of the drive element is oriented at an angle to a plane which is defined by the displacement axis and the axis of rotation of the spindle.

11 Claims, 2 Drawing Sheets

ACTUATING DEVICE

CROSS REFERENCE TO RELATED APPLICATION

This application claims priority to German Patent Application No. 10 2022 130 161.3, filed in Germany on Nov. 15, 2022, the entire contents of which are hereby incorporated herein by this reference.

DESCRIPTION

The present invention relates to an actuating device for a vehicle part that can be moved relative to a body of a vehicle, and in particular a vehicle door or a vehicle hatch.

From the prior art, actuating devices for driving movable vehicle parts are known in which a motor drives a spindle nut in order to displace a spindle along its longitudinal axis and thereby move the vehicle part. However, it has been shown that—particularly in the case of vehicle parts that can be pivoted relative to the body—a relatively large space around the actuating device has to remain free in order to enable a pivoting movement of the spindle and/or of the entire actuating device, which movement accompanies the pivoting of the vehicle part.

The object of the present invention is therefore to provide an actuating device which can be used in a space-optimised manner in a vehicle.

This object is achieved by an actuating device for a vehicle part that can be moved relative to a body of a vehicle, and in particular a vehicle door or a vehicle hatch, comprising:

- a drive assembly having a drive unit and a drive element driven by the drive unit, and
- an actuating element which can be displaced relative to the drive assembly along a displacement axis by means of the drive unit, wherein the actuating element is connected to a carriage assembly which is in threaded engagement with a spindle, wherein the spindle can be driven rotationally about an axis of rotation by the drive unit,
- characterised in that a central axis of the drive element is oriented at an angle to a plane which is defined by the displacement axis and the axis of rotation of the spindle.

In this case, the angled orientation of the central axis of the drive element relative to the plane can be seen or formed in particular in a viewing direction along the displacement axis. In this case, the central axis of the drive element can be arranged at an angle of approximately 90° to the displacement axis in a side view which is orthogonal both to the central axis of the drive element and to the displacement axis.

In a conceivable arrangement of the actuating device, the actuating element can be connected with its free end, which is opposite to the drive assembly, to the movable vehicle part. In this case, the drive assembly can be connected to the body essentially immovably. Of course, an inverted arrangement is also conceivable in which the free end of the actuating element is connected to the body, wherein, here, in particular the drive assembly can be connected essentially immovably to the movable vehicle part.

As a result of this angled orientation of the central axis of the drive element, and thus, where applicable, of the entire drive assembly, relative to the plane, installation space for the arrangement of the actuating device in the vehicle can be utilised in an optimised manner and thus reduced. Furthermore, the attachment of the actuating device to the vehicle body or to the movable vehicle part as a rigid fastening can additionally save required space.

The actuating device according to the invention can be configured, for example, to drive the movable vehicle part in two different modes, viz., a support mode in which the actuating device supports the user during manual movement of the movable vehicle part in such a way that the user can move the movable vehicle part with the least possible effort, and an automatic mode in which the actuating device moves the movable vehicle part independently, i.e., without the action of the user.

Very generally, the actuating element can have a round or a rectangular cross-section transverse to the main extension direction thereof.

Advantageously, the actuating element can be curved, and in particular S-shaped. In this way, the actuating element can emulate the shape of a conventional door check, which is customary, for example, in manually-operable doors. Due to the S-shaped design of the actuating element, required space can be further reduced, since the shape of the actuating element can be matched to the pivoting movement of the vehicle part.

In particular, the drive element can be a worm which meshes with a worm wheel connected to the spindle. In this case, the worm wheel can be fixedly connected as a separately manufactured component to the spindle, or the worm wheel can form an integral part of the spindle. It is also conceivable for the worm wheel to be provided with an overload function—for example, a friction coupling. Thus, the worm wheel can in particular rotate relative to the spindle in the event of an overload. As a result, damage to the drive and/or to the movable vehicle part can be avoided. As a result of a suitable oblique position of the central axis of the drive element in a direction along the axis of rotation of the spindle or as a result of a suitable tilting of the central axis of the drive element about an axis running orthogonally to the axis of rotation of the spindle, the worm wheel can also be provided with a straight spur gear.

The axis of rotation of the spindle can be oriented substantially parallel to the displacement axis. This can simplify the design of the carriage assembly to the effect that the spindle nut displaceable on the spindle displaces the actuating element essentially in a straight line in the direction of the displacement axis or the axis of rotation.

In a development of the present invention, the angle between the central axis of the drive element and the plane defined by the displacement axis and the axis of rotation of the spindle can be from 3° to 10°, in particular from 5° to 8°, and particularly preferably from 6° to 7°. It has been shown that an arrangement in the range of the aforementioned angles can lead to a particularly optimised installation space utilisation of the actuating device according to the invention.

Furthermore, the carriage assembly can comprise at least one guide portion, which is configured to engage with a respective corresponding counter-portion of a housing surrounding the carriage assembly. In this way, the carriage assembly can be reliably guided along the displacement axis, and undesired movements thereof can be avoided.

The at least one guide portion can comprise a material which is different from a portion, on which the guide portion is arranged, of the carriage assembly. For example, it is conceivable that the guide portion comprise a material with particularly favourable sliding properties, such as PTFE.

The actuating element can in particular be connected to the carriage assembly in such a way that a relative movement between the actuating element and the carriage assembly is possible. As a result, the actuating element can follow a corresponding movement of the vehicle part, without a movement of the entire actuating device, and in particular of the drive assembly, being necessary.

In this case, the relative movement between the actuating element and the carriage assembly can be possible essentially in one plane, wherein the actuating element can in particular be pivotable about a pivot axis arranged on the carriage assembly. For example, lateral pivoting of the actuating element relative to the carriage assembly can thus be possible, but vertical tilting (orthogonal to the lateral movement) relative to the carriage assembly can be prevented.

In order to displace the carriage assembly by the rotation of the spindle, the carriage assembly can comprise a spindle nut which is in threaded engagement with the spindle, wherein the spindle nut comprises the at least one guide portion. With respect to the aforementioned material of the at least one guide portion, the at least one guide portion can be designed as a component which is produced separately from the spindle nut and subsequently connected thereto, or the at least one guide portion can form an integral part of the spindle nut. In the latter case, the entire spindle nut can be formed from the material of the at least one guide portion.

In this connection, it can be provided that the carriage assembly can be displaceable relative to the spindle nut, and in particular can be pivotable about the spindle nut. The aforementioned vertical tilting of the actuating element, which is introduced into the actuating element as corresponding forces, can thus be enabled by the relative displaceability between the carriage assembly and the spindle nut. In this way, undesirable loads or even damage to the actuating device according to the invention can be reduced or even completely avoided. Furthermore, load-dependent bending moments acting upon the spindle can be avoided. Such bending moments can lead to a noticeable increase in the friction force of the drive, which can adversely affect the haptics during the manual movement of the movable vehicle part by the user in support mode. Due to the increase in the friction force of the drive, control problems can also occur in automatic mode.

In particular, a tilting axis about which the carriage assembly can be displaced relative to the spindle nut can run substantially orthogonally to the displacement axis of the actuating element. As described with reference to the example of an actuating device which is arranged in such a way that the axis of rotation of the spindle is arranged vertically directly below the displacement axis of the actuating element and runs substantially parallel thereto, the tilting axis about which the carriage assembly can be displaced relative to the spindle nut can be oriented substantially horizontally and orthogonally to the axis of rotation of the spindle in order thus to enable tilting of the actuating element in the vertical direction.

In order to enable this tilting of the actuating element or of a portion of the carriage assembly, to which the actuating element is connected, relative to the spindle nut, the longitudinal ends of the spindle nut can be provided with a curvature. This curvature can correspond to the curvature of a circle whose centre coincides with a centre of the longitudinal extension of the spindle nut and the axis of rotation of the spindle and which has a radius which corresponds to the distance of the centre of the circle from a longitudinal end of the spindle nut. Analogously, those surfaces of the carriage assembly that are in contact with the spindle nut can be curved.

The present invention is described in greater detail below with reference to an exemplary embodiment. In the figures.

Figure 1:
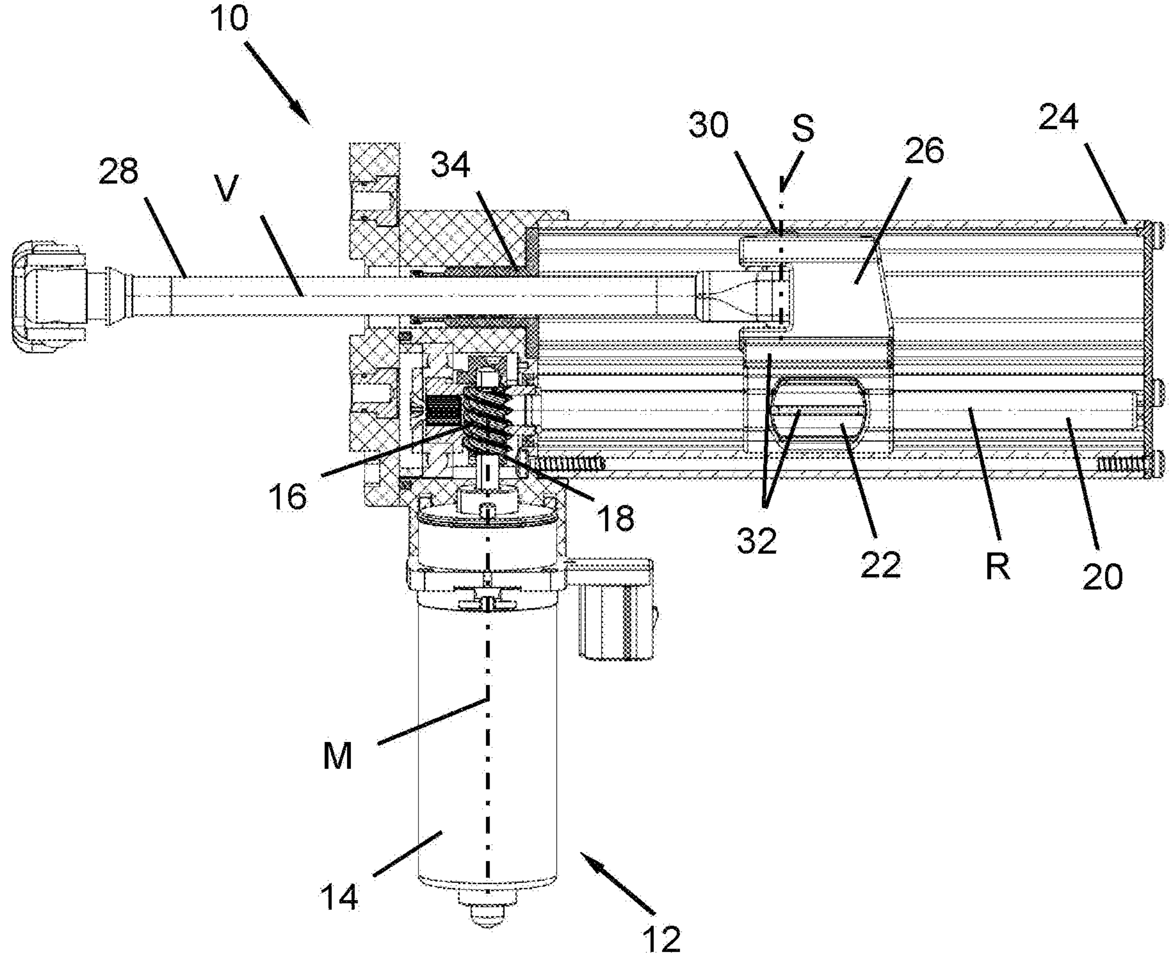
FIG. 1 shows a cross-sectional side view of an actuating device according to the invention.

In FIG. 1, an actuating device according to the invention is denoted overall by reference sign 10. The actuating device 10 comprises a drive assembly 12 having a drive unit 14 and a drive element 16 driven by the drive unit 14. The drive element 16, which here is designed as a worm, which is rotationally driven by the drive unit 14 designed as an electric motor, meshes with a worm wheel 18. The worm wheel 18 is fixedly arranged on a spindle 20 so that rotation of the drive element 16 brings about rotation of the worm wheel 18 and thus of the spindle 20.

The spindle 20 is in threaded engagement with a spindle nut 22, wherein the spindle nut 22 is arranged in a rotationally secured manner relative to a housing 24 of the actuating device 10 and, upon rotation of the spindle 20, can thus be displaced axially along an axis of rotation R of the spindle 20.

In the embodiment of the actuating device 10 shown, the spindle nut 22 is part of a carriage assembly 26 which, upon rotation of the spindle 20, can be displaced, together with the spindle nut 22, along the axis of rotation R of the spindle 20. At an, in FIG. 1, upper side of the carriage assembly 26, said carriage assembly is connected to an actuating element 28, which is designed here as a straight door check. Alternatively, the actuating element 28 could also be S-shaped, wherein this S-shape can extend substantially in a plane which is oriented parallel to the axis of rotation R of the spindle 20 and orthogonally to the sheet plane of FIG. 1. In the embodiment shown, the actuating element 28 has a round cross-section. Alternatively, however, it can also be rectangular or approximately oval.

At its free end shown on the left in FIG. 1, the actuating element 28 is connected to a movable vehicle part, such as a side door of a vehicle (not shown). At its end opposite the free end, the actuating element 28 is connected to the carriage assembly 26 via a pivot axis 30 in such a way that a movement of the actuating element 28 out of the sheet plane of FIG. 1 about the pivot axis 30 or about the imaginary axis of rotation S is possible.

Upon activation of the drive unit 14, the spindle 20 is thus put in rotation, whereby the actuating element 28 is displaced via the carriage assembly 26 along a displacement axis V, which, in the neutral position shown in FIG. 1 of the actuating element 28 and of the carriage assembly 26 (see below), coincides with a central axis of the straight actuating element 28.

In order to also enable a certain movement of the free end of the actuating element in an upward and downward direction in FIG. 1, the part of the carriage assembly 26 to which the actuating element 28 is connected is arranged in the embodiment shown so as to be tiltable relative to the spindle nut 22. For this purpose, the longitudinal ends of the spindle nut 22 can be provided with a curvature corresponding to the curvature of a circle whose centre coincides with a centre of the longitudinal extension of the spindle nut 22 and the axis of rotation R of the spindle 20 and which has a radius which corresponds to the distance of the centre of the circle from a longitudinal end of the spindle nut 22. Analogously, those surfaces of the rest of the carriage assembly 26 that are in contact with the spindle nut 22 can be curved.

In the region of the spindle nut 22 and/or on a portion separated therefrom, the carriage assembly 26 can comprise at least one guide portion 32 via which the carriage assembly 26 is guided in the housing 24 of the actuating device 10. In the exemplary embodiment shown in FIG. 1, the carriage assembly 26 comprises a corresponding guide portion 22 both in the region of the spindle nut 22 and on a further portion. For reasons of symmetrical force distribution, these two guide portions can also be present on the opposite side (not visible in FIG. 1) of the carriage assembly 26.

In order to protect the interior of the actuating device 10 against soiling, the actuating device 10 in the embodiment shown comprises a seal assembly 34 which is arranged between the actuating element 28 and the housing 24. The seal assembly 34 is in this case configured to be able to follow the pivoting and tilting movements of the actuating element 28. The seal assembly 34 can be designed to be substantially bellows-like.

In general, however, the actuating device 10 can also be designed without a seal assembly 34. In this case, it can be advantageous that, for example, the housing 24 is provided with at least one drainage hole so that moisture that has entered the housing 24 can escape.

Figure 2:
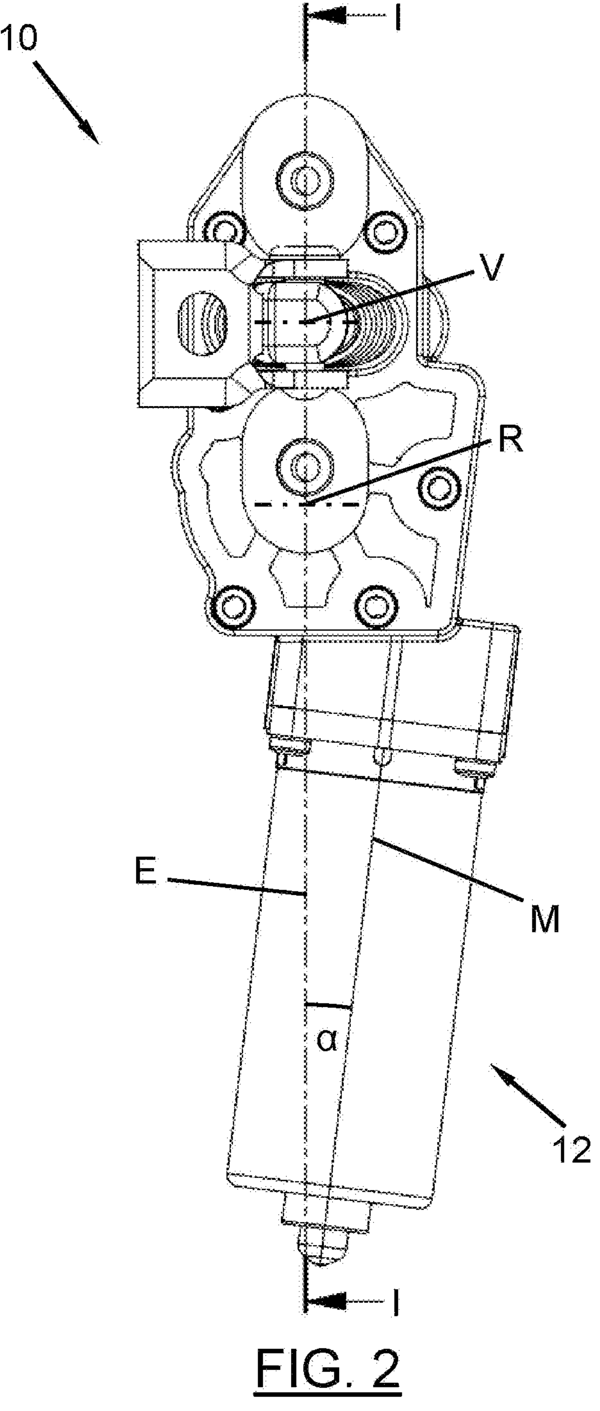
FIG. 2 shows a side view of the actuating device of FIG. 1.

FIG. 2 shows the actuating device 10 according to the invention of FIG. 1 in a side view. It can be seen that the central axis M of the drive element 16 is arranged at an angle to a plane E which is defined by the displacement axis V of the actuating element 28 (in the neutral position of the actuating element 28 and of the carriage assembly 26 as shown in FIG. 1) and the axis of rotation R of the spindle 20. In the embodiment shown, the angle $\alpha$ is approximately 6°. In FIG. 1, the plane E coincides with the sheet plane, i.e., the sectional plane I-I according to FIG. 1 corresponds here to the plane E.

As can be seen in particular in FIG. 2, a lower portion of the drive assembly 12 in FIG. 2 can thus be displaced into a region vertically below the spindle 20. The required installation space can thus be reduced, and in particular the installation space that is located on the right of the drive assembly 12 in FIG. 2.

Furthermore, by means of the design of the actuating device 10 according to the invention, movable attachment of the housing 24 of the actuating device 10 to the vehicle body or to the movable vehicle part can be changed to a rigid fastening, whereby required space can additionally be conserved.

The invention claimed is:

1. An actuating device for a vehicle part movable relative to a body of a vehicle, the actuating device comprising:

a drive assembly having a drive unit and a drive element driven by the drive unit, and an actuating element which can be displaced relative to the drive assembly along a displacement axis by the drive unit, wherein the actuating element is connected to a carriage assembly which is moveable along a spindle, wherein the spindle can be driven rotationally about an axis of rotation by the drive unit, wherein the carriage assembly comprises a spindle nut which is in threaded engagement with the spindle, wherein the carriage assembly is pivotable relative to the spindle nut, wherein a central axis of the drive element is oriented at an angle to a plane which is defined by the displacement axis and the axis of rotation of the spindle, wherein the axis of rotation of the spindle extends in a horizontal direction, and wherein the carriage assembly is pivotable relative to the spindle nut such that the actuating element is vertically tiltable relative to the horizontal direction.

2. The actuating device according to claim 1, wherein the drive element is a worm which meshes with a worm wheel connected to the spindle.

3. The actuating device according to claim 1, wherein the axis of rotation of the spindle is oriented substantially parallel to the displacement axis.

4. The actuating device according to claim 1, wherein an angle between the central axis of the drive element and the plane which is defined by the displacement axis and the axis of rotation of the spindle is from 3° to 10°.

5. The actuating device according to claim 4, wherein the angle between the central axis of the drive element and the plane which is defined by the displacement axis and the axis of rotation of the spindle is from 5° to 8°.

6. The actuating device according to claim 4, wherein the angle between the central axis of the drive element and the plane which is defined by the displacement axis and the axis of rotation of the spindle is from 6° to 7°.

7. The actuating device according to claim 1, wherein the carriage assembly comprises at least one guide portion which is configured to engage with a respective corresponding counter-portion of a housing surrounding the carriage assembly.

8. The actuating device according to claim 7, wherein the at least one guide portion comprises a material which is different from a portion, on which at least one the guide portion is arranged, of the carriage assembly.

9. The actuating device according to claim 7, wherein the spindle nut comprises the at least one guide portion.

10. The actuating device according to claim 1, wherein the actuating element is connected to the carriage assembly such that vertical tilting of the actuating element relative to the carriage assembly is prevented.

11. An actuating device for a vehicle part movable relative to a body of a vehicle, the actuating device comprising:

a drive assembly comprising a drive unit and a drive element driven by the drive unit; and an actuating element configured to be displaced relative to the drive assembly along a displacement axis by the drive unit, wherein the actuating element is connected to a carriage assembly which is moveable along a spindle, wherein the spindle is configured to be driven rotationally about an axis of rotation by the drive unit, wherein the carriage assembly comprises a spindle nut which is in threaded engagement with the spindle, wherein the carriage assembly is configured to be displaced relative to the spindle nut while the carriage assembly displaces the actuating element along the displacement axis, and wherein a central axis of the drive element is oriented at an angle to a plane which is defined by the displacement axis and the axis of rotation of the spindle, wherein the axis of rotation of the spindle extends in a horizontal direction, and wherein the carriage assembly is displaceable relative to the spindle nut such that the actuating element is vertically tiltable relative to the horizontal direction.

* * * * *